United States Patent
Eakins et al.

[11] Patent Number: 5,946,323
[45] Date of Patent: Aug. 31, 1999

[54] ASYNCHRONOUS TRANSFER MODE INTEGRATED ACCESS SERVICE

[75] Inventors: Richard Courtney Eakins, Bridgewater; Cheryl F. Newman, Red Bank; Ronald W. Toth, Milford; Fang Wu, North Middletown, all of N.J.

[73] Assignee: AT&T Corp, Middletown, N.J.

[21] Appl. No.: 08/752,126

[22] Filed: Nov. 20, 1996

[51] Int. Cl.[6] .............................. H04J 3/16; H04L 12/28
[52] U.S. Cl. ........................................... 370/468; 370/395
[58] Field of Search .................................... 370/468, 471, 370/395, 444, 260, 360, 397, 399

[56] References Cited

U.S. PATENT DOCUMENTS

| | | | |
|---|---|---|---|
| 4,924,458 | 5/1990 | Obara | 370/360 |
| 5,526,350 | 6/1996 | Gittins | 370/468 |
| 5,583,863 | 12/1996 | Darr | 370/397 |
| 5,682,386 | 10/1997 | Arimilli | 370/468 |
| 5,689,553 | 11/1997 | Ahuja | 370/260 |
| 5,742,601 | 4/1998 | Riedel | 370/395 |
| 5,757,801 | 5/1998 | Arimilli | 370/444 |
| 5,802,283 | 9/1998 | Grady | 379/399 |

*Primary Examiner*—Ajit Patel
*Assistant Examiner*—Ricardo M. Pizarro
*Attorney, Agent, or Firm*—Robert B. Levy; Stuart H. Mayer

[57] ABSTRACT

A communications system is provided which supports asynchronous transfer mode (ATM) communications. An ATM multiplexer is located at a customer's premises and connected to customer premises voice and data equipment. A central office ATM multiplexer is connected to various different networks in the existing network infrastructure. The central office ATM multiplexer is preferably connected to networks such as a low-speed packet-switched network, a public circuit-switched network, a private line network, and a high-speed packet-switched network. The ATM multiplexer located at the customer premises preferably supports dynamic bandwidth allocation. Additional features provided by the communications system include the ability to provide different voice encoding schemes for different users based on calling party or called party information.

21 Claims, 4 Drawing Sheets

5,946,323

ASYNCHRONOUS TRANSFER MODE INTEGRATED ACCESS SERVICE

FIELD OF THE INVENTION

This invention relates to telecommunications networks, and more particularly, to techniques for providing access to multiple networks in the existing network infrastructure using asynchronous transfer mode communications.

BACKGROUND OF THE INVENTION

Networks are presently being deployed that exploit the advantages of asynchronous transfer mode (ATM) communications. Communication with asynchronous transfer mode involves transmitting voice and data information in packets called ATM cells. ATM uses an optimization technique known as statistical multiplexing to increase the information carrying capacity of a given communications line compared to traditional schemes such as time division multiplexing (TDM).

Because of the enhanced information carrying capacity available with ATM, there has been some use of ATM communications networks to link large offices within an organization. With this type of arrangement, all of the voice and data traffic at a source office that is intended for a destination office can be converted to ATM format using an ATM multiplexer. The ATM traffic from the source office is demultiplexed at the destination office. If the communications traffic between the source and destination offices is sufficient, using this type of ATM arrangement may be cost effective.

However, there has been no known way in which to use this type of ATM arrangement to interconnect equipment with the other networks in the existing network infrastructure (i.e., traditional networks such as the long haul voice network). As a result, the customer must typically arrange for network service at the source and destination offices in addition to ATM service. Providing such additional communications services can be costly, because access charges (i.e., the charges associated with providing transport from a customer premises to a carrier point-of presence) are a significant component of the total cost of providing a service.

It is therefore an object of the present invention to provide a communications system in which the advantages of ATM communications are used to improve the way in which a customer is provided with access to networks in the existing network infrastructure.

SUMMARY OF THE INVENTION

This and other objects of the invention are accomplished in accordance with the principles of the present invention by providing a communications system that supports asynchronous transfer mode (ATM) communications between customer premises equipment and various off-site equipment. A customer-located ATM multiplexer is provided at a customer's premises and connected to the customer premises voice and data equipment. A central office ATM multiplexer located in a network central office is connected to various different networks in the existing network infrastructure. The networks connected to the central office ATM multiplexer preferably include a low-speed packet-switched network, a public circuit-switched network, a private line network, and a high-speed packet-switched network.

The customer-located ATM multiplexer preferably supports dynamic bandwidth allocation. Additional features provided by the communications system include the ability to provide different voice encoding schemes for different users based on calling party or called party information from the user.

Further features of the invention, its nature and various advantages will be more apparent from the accompanying drawings and the following detailed description of the preferred embodiments.

DETAILED DESCRIPTION OF THE PREFERRED EMBODIMENTS

Figure 1:
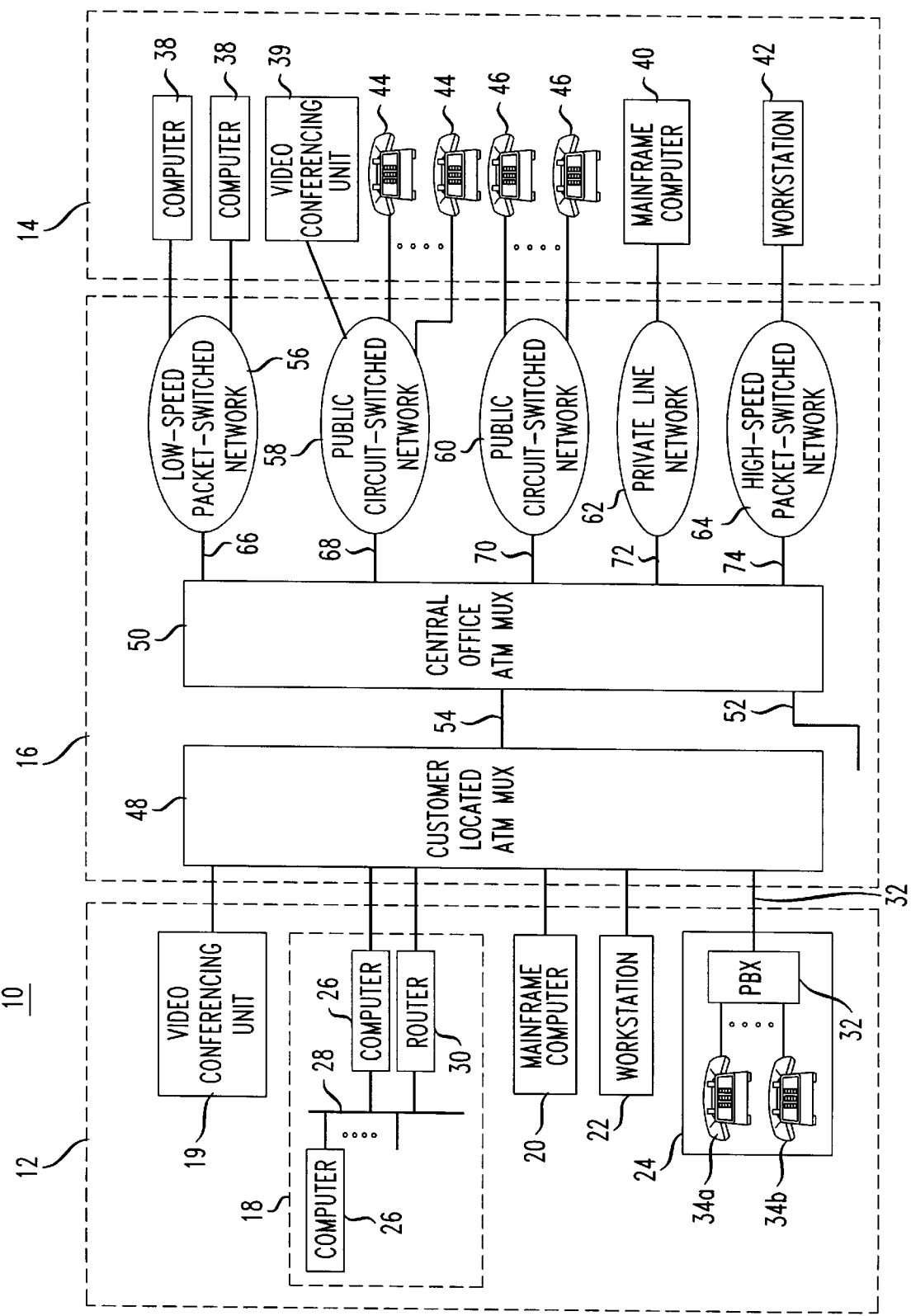
FIG. 1 is a diagram of a communications system providing integrated network access using asynchronous transfer mode communications in accordance with the principles of the present invention.

In communications system 10, customer premises equipment 12 is interconnected with off-site equipment 14 via network system 16, as shown in FIG. 1. Customer premises equipment 12 may include local area network 18, video conferencing unit 19, mainframe computer 20, workstation 22, and private branch exchange telephone system 24. Local area network 18 has computers 26, which are interconnected using, for example, bus 28. Local area network 18 also has router 30 connected to bus 28 for providing a communications pathway between local area network 18 and other systems. Video conferencing unit has a video camera for capturing video images and a monitor for displaying video. Private branch exchange telephone system 24 has a PBX switch 32 that interconnects multiple telephones 34 to a line 36. In general, computer-based systems, such as local area network 18, mainframe computer 20, and workstation 22 generate data traffic, whereas private branch exchange telephone system 24 generates voice traffic.

Customer premises equipment 12 must typically be interconnected to a variety of off site equipment 14. For example, a pathway for e-mail, Internet traffic, and other data communications might be provided between local area network 18 and computers 38 located at the customer's branch offices or at Internet nodes. A pathway for large data file transfers might be provided between mainframe computer 20 and mainframe computer 40 located at corporate headquarters. Another pathway might be provided for computer aided design and computer aided manufacturing (CAD/CAM) files to be shared between workstation 22 and workstation 42 located at a research and development site. Telephone links might be established between telephones 34 and telephones 44 and 46 located in the offices and homes of people called by the customer's employees. A video conferencing link might be provided between video conferencing unit 19 and video conferencing unit 39.

In order to support various types of communications traffic between customer premises equipment 12 and off-site equipment 14, communications system 10 has a customer premises asynchronous transfer mode (ATM) multiplexer 48 located at the customer premises and a corresponding central office ATM multiplexer 50. Although located on the customer premises, customer-located ATM multiplexer 48 may be installed and maintained by a network service provider. Central office ATM multiplexer 50 accepts simultaneous inputs from additional multiple customer-located ATM multiplexers (not shown) via lines such as line 52. Central office ATM multiplexer 50 and customer-located ATM multiplexer 48 are connected by communications line 54, which may be part of the public telecommunications network. If desired, a standard ATM switch (or switches) may be provided between customer-located ATM multiplexer 48 and central office ATM multiplexer 50 to direct a portion of the traffic on line 54 directly to high-speed packet-switched network 64, bypassing central office ATM multiplexer 50.

Customer-located ATM multiplexer 48 accepts communications traffic from customer premises equipment 12 in various formats and converts this information to packets of information that are transferred asynchronously to central office ATM multiplexer 50 using asynchronous transfer mode communications. Communications line 54 between customer-located ATM multiplexer 48 and central office ATM multiplexer 50 preferably supports ATM UNI traffic (e.g., ATM traffic on a DS1 (T1) line using the user-to-network interface format.) An illustrative presently available customer-located ATM multiplexer 48 is the Magellan Passport 50 of Nortel corporation. An illustrative presently available central office ATM multiplexer 50 is the Nortel Magellan Passport 160. Customer-located ATM multiplexer 48 preferably supports DS1, fractional DS1, or DS0 frame relay traffic from local area network 18, various types of DS1 or fractional DS1 traffic from mainframe computer 20 and telephone system 24, motion picture expert group (MPEG) traffic from video conferencing unit 19, and DS1 ATM UNI traffic from workstation 22.

Central Office ATM multiplexer 50 is directly interconnected to various types of networks, such as low-speed packet-switched network 56, public circuit-switched network 58, public circuit-switched network 60, private line network 62, and high-speed packet-switched network 64. A suitable network arrangement involves using a the AT&T InterSpan® network for the low-speed packet-switched network 56 connected to central office ATM multiplexer 50 via line 66. Line 66 may be an FR NNI line (i.e., a line using a frame relay protocol with a network-to-node interface format), an FR UNI line (i.e., a line using a frame relay protocol with a user-to-network interface format), an ATM UNI line, or an ATM NNI line. The AT&T circuit-switched network can be used for either public circuit-switched network 58 or 60 and may be connected to central office ATM multiplexer 50 via a DS1 (T1), DS3, or STS-1 line 68. In general, public circuit-switched networks 58 and 60 may be operated by different carriers. For example, public circuit-switched network 58 may be operated by AT&T and public circuit-switched network 60 may be operated by a non-AT&T carrier. Private line network 62 can be the AT&T ACCUNET® network connected to central office ATM multiplexer 50 via a DS1 (T1), DS3, or STS-1 line 72. High-speed packet-switched network 64 can be, for example, the AT&T ACCUNET® packet service network and can be connected to central office ATM multiplexer 50 via X.25 line 74.

A substantial amount of the network capacity and capability in networks 56, 58, 60, 62, and 64 exists in the current network infrastructure, and is therefore available for efficiently handling a sizable amount of communications traffic. Moreover, traditional networks (particularly public circuit-switched networks 58 and 60) are widely used for establishing communications with some of the end equipment 14 (e.g., telephones 44 and 46). Because the end destinations of the traffic from customer premises equipment 12 are at geographically diverse locations, using multiple networks 56, 58, 60, 62, and 64 is essential for providing comprehensive communications service for traffic from a given customer premises. Although ATM multiplexers have previously been used to provide enhanced communications capacity between large offices within an organization, no previous ATM systems have provided connections to multiple networks as shown in FIG. 1. As a result, no previous ATM systems have supported comprehensive communications between customer premises equipment 12 and geographically diverse end equipment 14.

One of the advantages of the arrangement of system 10 is that it reduces the portion of the cost of providing communication service at a given location that is associated with providing communications from the customer premises to the carrier point-of-presence (i.e., access costs). Access costs can be a significant fraction of the total cost of providing a communications service. With the arrangement of FIG. 1, it is possible to support all communications service from customer premises 12 with a lower capacity communications line than currently used.

In addition, providing asynchronous transfer mode communications between customer-located ATM multiplexer 48 and central office ATM multiplexer 50 allows a greater amount of the customer's communications traffic to be supported for a given bandwidth on communications line 54. Using asynchronous transfer mode communications rather than traditional time division multiplexing (TDM) technology increases the information carrying capacity of the line due to the optimization technique known as statistical multiplexing that is used by ATM communications. Increasing the effective communications capacity of line 54 helps to reduce the number of communication line connections needed at a given customer premises 12.

Further, because a customer can consolidate all of the communications traffic from customer premises equipment 12 at a single location, using customer-located ATM multiplexer 48 allows the customer to obtain a wide variety of communications services from a single trusted service provider. Without customer-located ATM multiplexer 48, the user would potentially need to obtain service from multiple providers (e.g., voice telephone service from one provider and private line data service from another). Overall network efficiencies are achieved by connecting multiple customers to each central office ATM multiplexer 50.

Communications system 10 preferably supports a number of additional functions that allow the bandwidth of communication line 54 to be used effectively. For example, customer-located ATM multiplexer 48 preferably allows the bandwidth allocated for various components of the communications traffic through customer-located ATM multiplexer 48 to be configured dynamically. When the volume of voice traffic changes, e.g., data traffic can dynamically expand or contract to fit the remaining bandwidth of the communication channel. This allows the customer to use the available bandwidth of line 54 more efficiently than traditional fixed allocation time division multiplexing (TDM) schemes.

For example, a customer may subscribe to DS1 service consisting of 24 DS0 channels (i.e., all the DS0 channels per DS1 line). Without dynamic bandwidth allocation, the customer may need to permanently dedicate 17 DS0 channels to voice and seven DS0 channels to data. Even at times in which some of the voice channels are not being used, the data capacity of the system is limited to seven DS0 channels. With dynamic bandwidth allocation, if only three of the 17 DS0 voice channels are in use, the data traffic can expand to use a bandwidth of up to 1.344 Mbps (equivalent to 21 DS0 channels).

If desired, the bandwidth can be dynamically allocated among various data components based on predetermined priorities. For example, data traffic from local area network 18 can be given priority over data traffic from mainframe 20. When the volume of data traffic from local area network 18 is low, the bandwidth allocated to data traffic from mainframe 20 can be increased accordingly.

Another feature that is preferably provided by customer-located ATM multiplexer 48 and central office ATM multiplexer 50 of network system 16 is activity detection and idle suppression. Applied to voice, activity detection and idle suppression allows the bandwidth occupied by a given voice channel to expand and contract with the instantaneous information content of the signal. During periods of relative silence, more bandwidth is available for other uses (e.g., it can be dynamically allocated for data communications). A minimum quality of service is preferably ensured from the customer premises side of customer-located ATM multiplexer 48 through central office ATM multiplexer 50 by using certain ATM classes of service suitable for interactive realtime traffic, such as variable bit rate realtime (VBR-RT) service or deterministic bit rate (DBR) service. VBR-RT and DBR service are implemented on customer-located ATM multiplexer 48 and central office ATM multiplexer 50.

System 10 can vary the voice encoding scheme that is used based on signaling information such as calling number information (caller ID) or called number information (dialed number). For example, PBX switch 32 can be configured to route a call to an appropriate trunk subgroup in line 36, so that customer-located ATM multiplexer 48 can arrange for an appropriate encoding scheme to be used for the call.

The Nortel Magellan Passport switches Models 50 and 160 are examples of presently available ATM multiplexers that support dynamic bandwidth allocation (including the ability to dynamically allocate between data traffic components based on predetermined priorities), activity detection and idle suppression, and various modes of voice encoding. These switches also ensure a minimum quality of service.

If desired, customer-located ATM multiplexer 48 and central office ATM multiplexer 50 can interpret signaling information, such as calling number and called number information, directly and can use this information to select an appropriate encoding scheme for a call. For example, PBX switch 32 can be configured to route certain calls to a trunk subgroup in line 36 and customer-located ATM multiplexer 48 can select an appropriate encoding scheme accordingly. In addition, customer-located ATM multiplexer 48 and central office ATM multiplexer 50 can be responsive to traffic levels on line 54, selecting, e.g., a lower bit rate encoding scheme during periods of high traffic.

Figure 2:
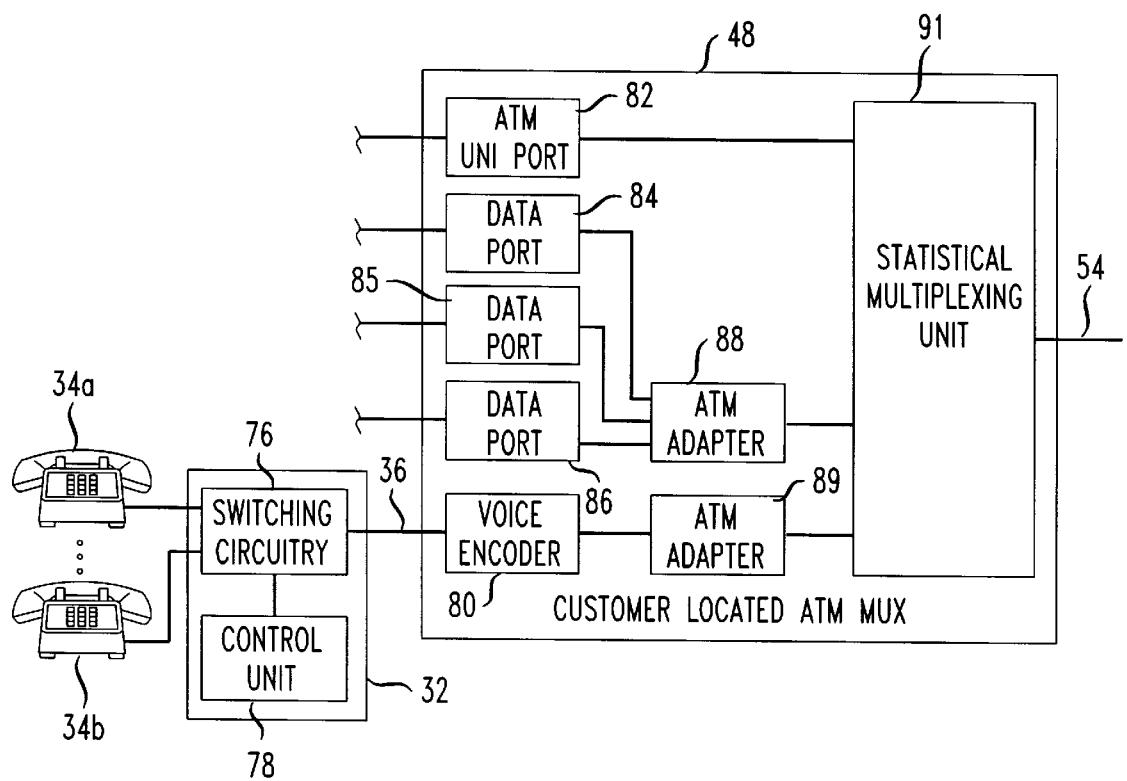
FIG. 2 is a diagram of a public branch exchange switch and an customer-located asynchronous transfer mode multiplexer constructed in accordance with the principles of the present invention.

As shown in FIG. 2, PBX switch 32 contains switching circuitry 76 and control unit 78. Control unit 78 preferably contains a processor for executing instructions to direct the operation of switching circuit 76. PBX switch 32 can be configured to provide desired features by providing suitable instructions for control unit 78. Switching circuit 76 interconnects telephones 34 at customer premises 12 with voice encoder 80 in customer-located ATM multiplexer 48. Data ports 82, 84, and 86 are used to connect various types of data equipment at customer premises 12 to line 54. ATM data from ATM UNI port 82 is passed to statistical multiplexing unit 91. Non-ATM data from ports 84, 85, and 86 is passed to ATM adapter 88, where this information is converted into ATM format for communication with central office ATM multiplexer 50. Similarly, voice information from voice encoder 80 is passed to ATM adapter 89. ATM formatted signals from ATM UNI port 82 and ATM adapters 88 and 89 are statistically multiplexed by statistical multiplexing unit 91 for communication with central office ATM multiplexer 50.

Voice calls from PBX switch 32 are encoded by encoder 80, for example, using pulse code modulation (PCM) (i.e., at 64 kbps), adaptive differential PCM (ADPCM) (e.g., at 32 kbps or 16 kbps), or other suitable encoding schemes such as CS-ACELP (at 8 kbps) defined by the International Telecommunications Union (ITU). With traditional PBX arrangements, only PCM is used for access links into public circuit-switched networks 58 and 60. For example, if it is determined that the highest possible quality of service is desired, a traditional PCM encoding scheme operating at 64 kbps might be used. More economical service at nearly the same perceived level of quality for voice communications might be provided by ADPCM at 32 kbps.

In accordance with the present invention, the encoding scheme used for a particular voice line can be selected based on signaling information such as caller ID or dialed number information. This arrangement allows certain calls (e.g., those associated with telephones such as telephone 34a) to use one encoding scheme (e.g., 64 kbps PCM—suitable for the highest quality requirements and fax and modem communications), whereas other calls (e.g., those associated with telephones such as telephone 34b) can use another encoding scheme (for example, ADPCM at 16 kbps—suitable for normal users). Voice encoder 80 contains digital signal processing hardware and software to provide the desired range of encoding schemes to be used. Voice encoder 80 preferably also contains hardware and software for reverting to a 64 kbps PCM encoding scheme whenever fax and modem tones are detected, to ensure that this type of traffic is not disrupted. PBX switch 32 can be configured to recognize and process the signaling information such as caller ID and dialed number information that is used to set up a call with a particular encoding scheme. Alternatively, these PBX switch functions can be incorporated into customer-located ATM multiplexer 48. A processing module (hardware and/or software) within customer-located ATM multiplexer 48 executes instructions to direct the operation of customer-located ATM multiplexer 48. Customer-located ATM multiplexer 48 can be configured to provide desired features by providing suitable instructions for the processing module.

Figure 3:
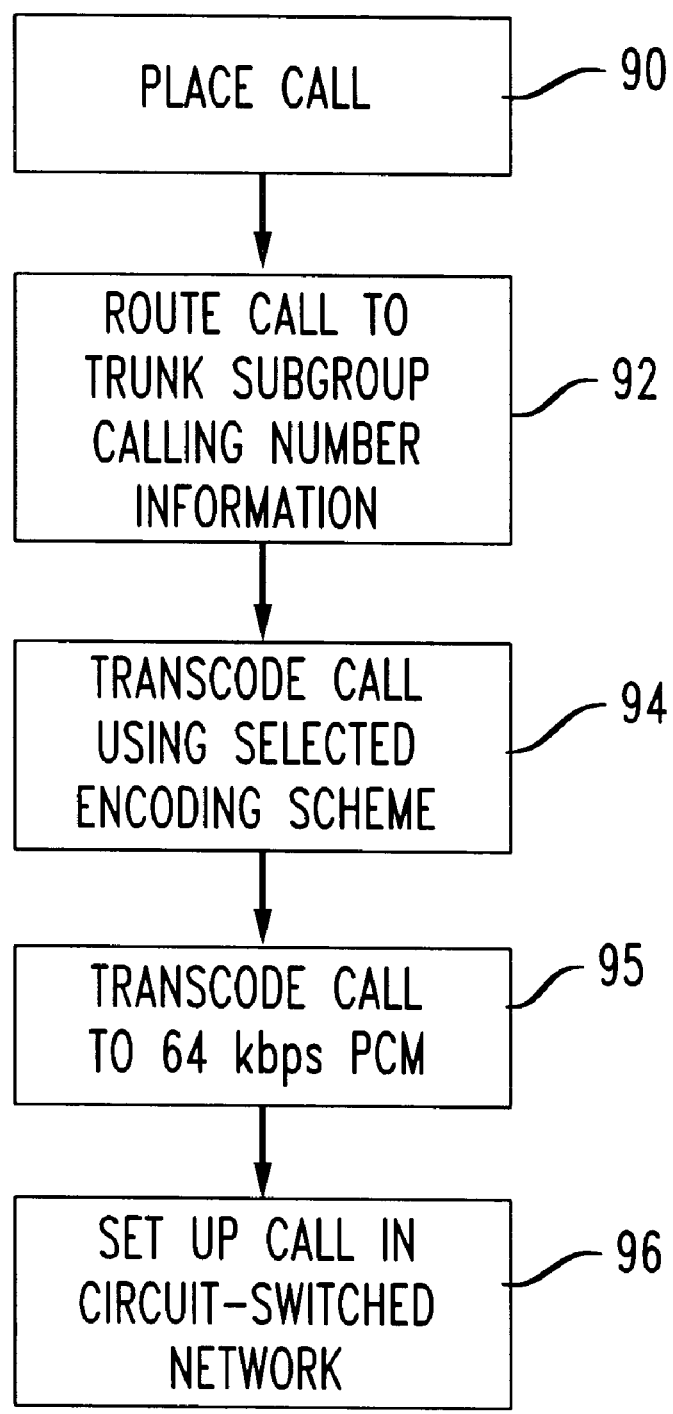
FIG. 3 is a flow chart diagram of steps involved in setting up an outgoing call in accordance with the present invention.
Figure 4:
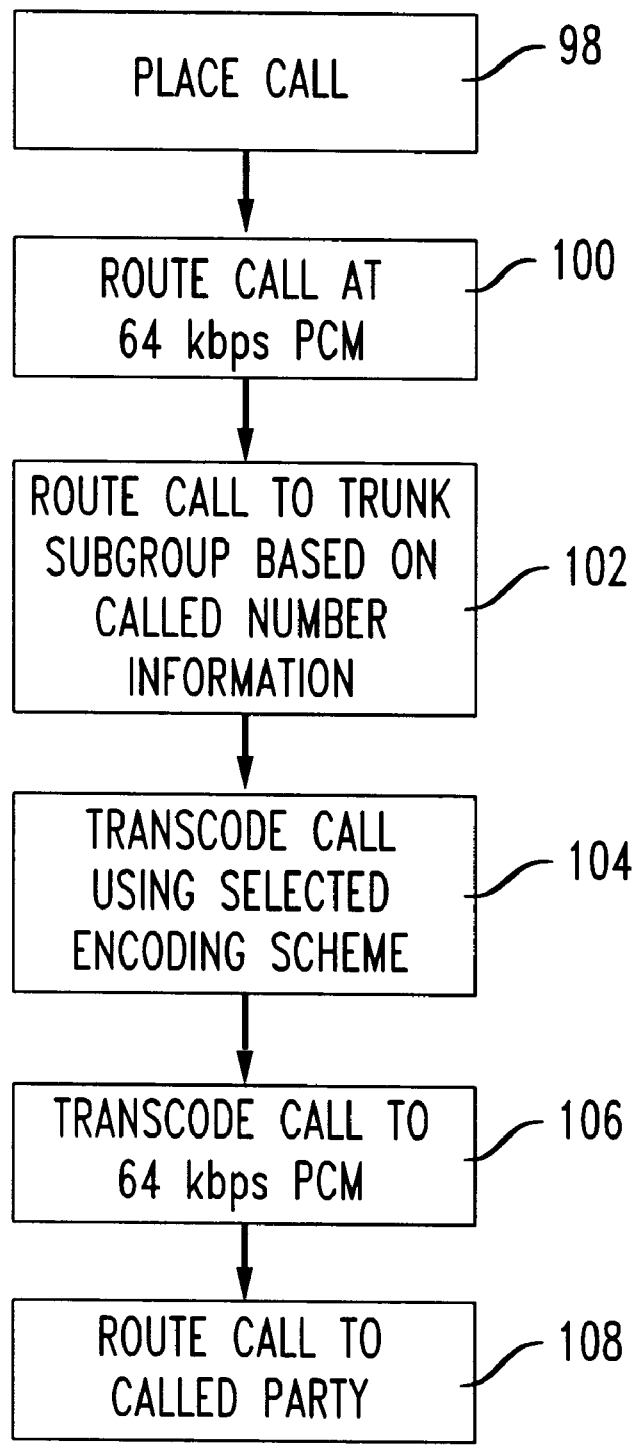
FIG. 4 is a flow chart diagram of steps involved in setting up an incoming call in accordance with the present invention.

The steps involved in setting up outgoing telephone calls using different voice encoding schemes for different users are shown in FIG. 3. The steps involved in setting up incoming telephone calls using different voice encoding schemes for different users are shown in FIG. 4. For purposes of illustration, consider the scenario in which 400 telephones 34 are connected to PBX switch 32 (FIG. 2). Telephones 34a (e.g., telephone Nos. 1–200) are associated with "first class" service (e.g., 64 kbps PCM), whereas telephones 34b (e.g., telephone Nos. 201–400) are associated with "economy class" service (e.g., 32 kbps ADPCM).

In order to arrange for an outgoing call, a user at telephone 34b places a call (e.g., to a party connected to a telephone 46) at step 90, as shown in FIG. 3. At step 92, PBX switch 32 determines that the call from telephone 34b should be routed to a trunk subgroup within line 36 that is directed to a port on customer-located ATM multiplexer 48 that uses 32 kbps encoding. At step 94, customer-located ATM multiplexer 48 transcodes 64 kbps PCM input from that port to 32 kbps ADPCM voice coding and statistically multiplexes the resulting output for line 54 with statistical multiplexing unit 91. At step 95, central office ATM multiplexer 50 transcodes the 32 kbps ADPCM signal to 64 kbps PCM for normal input to a circuit-switched network (e.g., public circuit-switched network 60). Call setup is completed by the local voice network (e.g., public circuit-switched network 60) at step 96.

In order to arrange for an incoming call to telephone 34*b*, a user at telephone 46 places a call at step 98, as shown in FIG. 4. At step 100, public circuit-switched network 60 routes the call normally, at 64 kbps PCM. At step 102, the last switch in network 60 routes the call to an appropriate trunk subgroup on line 70 based on called number information from telephone 46. At step 104, central office ATM multiplexer 50 take the call from that subgroup and transcodes the call (and any other calls associated with that subgroup) from 64 kbps PCM to 32 kbps ADPCM and statistically multiplexes them onto line 54. At step 106, customer-located ATM multiplexer 48 transcodes the 32 kbps ADPCM to 64 kbps PCM and delivers the call to PBX 32 on line 36. At step 108, PBX 32 routes the call to telephone 34*b* at, e.g., 64 kbps PCM.

Various other arrangements are possible. For example, more than two different encoding schemes can be used for the various different telephones 34. In addition, PBX switch 32 can select the encoding scheme based on the destination of the call, rather than the identity of the calling party, as was done in the foregoing example. For example, PBX switch 32 can determine whether the call is directed to an international location based on called party (dialed number) information. If a call is directed to an international (or geographically remote) location, then a trunk subgroup in line 36 that is associated with one of the more efficient encoding schemes (e.g., CSA-CELP at 8 kbps) can be used. By providing central office ATM multiplexers 50 internationally, it is possible to carry such international calls as ATM traffic to a geographic location close to the international destination.

The foregoing is merely illustrative of the principles of this invention and various modifications can be made by those skilled in the art without departing from the scope and spirit of the invention.

What is claimed is:

1. A method for supporting communications traffic from users of customer premises equipment to users of off-site equipment using a customer-located asynchronous transfer mode (ATM) multiplexer, a central office ATM multiplexer, and a plurality of networks each of which is connected to a portion of the off-site equipment, comprising the steps of:

providing said customer-located ATM multiplexer, so that said customer premises equipment can be connected to said customer-located ATM multiplexer for providing communications traffic over said customer-located ATM multiplexer, the traffic including voice and data that occupies a bandwidth;

providing a central office ATM multiplexer in a network central office, said central office being connected to said customer-located ATM multiplexer by a communication line, said communication line supporting said communications traffic between said customer-located ATM multiplexer and said central office ATM multiplexer;

providing a plurality of connections between said central office ATM multiplexer and said networks, each of said connections being to a respective one of said networks for supplying a part of said communications traffic to the off-site equipment connected to said network and using different voice encoding schemes for different users.

2. The method defined in claim 1 further comprising the step of dynamically allocating available bandwidth on said communication line.

3. The method defined in claim 2 wherein said step of dynamically allocating available bandwidth on said communication line further comprises the step of dynamically allocating bandwidth between voice traffic and data traffic.

4. The method defined in claim 2 further comprising the step of providing activity detection and idle suppression service with said customer-located ATM multiplexer and said central office ATM multiplexer to allow the bandwidth occupied by voice traffic on said communication line to expand and contract in realtime.

5. A method for supporting communications traffic from users of customer premises equipment to users of off-site equipment using a customer-located asynchronous transfer mode (ATM) multiplexer, a central office ATM multiplexer, and a plurality of networks each of which is connected to a portion of the off-site equipment, comprising the steps of:

providing said customer-located ATM multiplexer, so that said customer premises equipment can be connected to said customer-located ATM multiplexer for providing communications traffic over said customer-located ATM multiplexer, the traffic including voice and data that occupies a bandwidth;

providing a central office ATM multiplexer in a network central office, said central office being connected to said customer-located ATM multiplexer by a communication line, said communication line supporting said communications traffic between said customer-located ATM multiplexer and said central office ATM multiplexer;

providing a plurality of connections between said central office ATM multiplexer and said networks, each of said connections being to a respective one of said networks for supplying a part of said communications traffic to the off-site equipment connected to said network and using different voice encoding schemes for different users;

wherein the step of using different voice encoding schemes comprises the step of determining which encoding scheme to use for a given user based on signaling information received from a user.

6. The method defined in claim 5 wherein the step of determining which encoding scheme to use comprises the step of determining which encoding scheme to use based on calling party information.

7. The method defined in claim 5 wherein the step of determining which encoding scheme to use comprises the step of determining which encoding scheme to use based on called party information.

8. The method defined in claim 7 wherein the step of determining which encoding scheme to use based on called party information comprises the step of using a voice encoding scheme that uses less bandwidth than a standard 64 kbps pulse code modulation (PCM) scheme when it is determined that said called party information corresponds to an international destination.

9. A communications system for supporting communications traffic from users of customer premises equipment to users of off-site equipment using asynchronous transfer mode (ATM) communications and using a plurality of networks each of which is connected to a portion of the off-site equipment, comprising:

a customer-located ATM multiplexer connected to said customer premises equipment for supporting communications traffic including voice and data that occupy a bandwidth, said customer-located ATM multiplexer using different voice encoding schemes for voice traffic from different users and said customer-located ATM multiplexer dynamically allocating available bandwidth on said communication line between voice and data traffic; and a central office ATM multiplexer in a network central office, said central office ATM multiplexer being connected to said customer-located ATM multiplexer by a communication line and said central office ATM multiplexer being separately connected to each of said networks for supplying a part of said communications traffic to the off-site equipment connected to each of said networks.

10. The system defined in claim 9 wherein said customer-located ATM multiplexer uses an activity detection and idle suppression service to allow the bandwidth occupied by voice traffic on said communication line to expand and contract in realtime.

11. The system defined in claim 9 wherein each voice encoding scheme that is used is determined based on signaling information received from a user.

12. The system defined in claim 11 wherein the voice encoding scheme that is used is determined based on calling party information.

13. The system defined in claim 11 wherein the voice encoding scheme that is used is determined based on called party information.

14. The system defined in claim 13 wherein when it is determined that said called party information corresponds to an international destination, a voice encoding scheme that uses less bandwidth than a standard 64 kbps pulse code modulation (PCM) scheme is used.

15. The system defined in claim 9 wherein said central office ATM multiplexer dynamically allocates available bandwidth on said communication line.

16. The system defined in claim 15 wherein said central office ATM multiplexer dynamically allocates available bandwidth on said communication line between voice traffic and data traffic.

17. The system defined in claim 15 wherein said central office ATM multiplexer uses an activity detection and idle suppression service to allow the bandwidth occupied by voice traffic on said communication line to expand and contract in realtime.

18. The system defined in claim 9 wherein the voice encoding scheme that is used is determined based on signaling information received from a user.

19. The system defined in claim 18 wherein the voice encoding scheme that is used is determined based on calling party information.

20. The system defined in claim 18 wherein the voice encoding scheme that is used is determined based on called party information.

21. The system defined in claim 20 wherein when it is determined that said called party information corresponds to an international destination, a voice encoding scheme that uses less bandwidth than a standard 64 kbps pulse code modulation (PCM) scheme is used.

* * * * *